United States Patent [19]

Zoschg et al.

[11] Patent Number: 4,527,985

[45] Date of Patent: Jul. 9, 1985

[54] FOWL CALL SILENCER

[76] Inventors: James R. Zoschg, Box 1300, R.D. #1; Gary E. Lisac, Box 75, both of Shinglehouse, Pa. 16748

[21] Appl. No.: 488,793

[22] Filed: Apr. 26, 1983

[51] Int. Cl.³ .............................................. A63H 5/00
[52] U.S. Cl. ...................................... 446/397; 24/68 F
[58] Field of Search ................... 446/397, 418; 84/363, 84/364, 406, 375; 24/68 F, 715 T, 68 E, 68 R, 68 CD, 68 SB, 68 J, 68 AS, 68 PP, 68 FP; 248/500, 505, 302, 154

[56] References Cited

U.S. PATENT DOCUMENTS

| | | | |
|---|---|---|---|
| 333,094 | 12/1885 | Fuller | 84/363 X |
| 738,181 | 9/1903 | Goldberg | 84/375 |
| 3,203,058 | 8/1965 | Roing | 24/68 F |
| 3,793,767 | 2/1974 | Pulley | 446/397 |

FOREIGN PATENT DOCUMENTS 1812916  7/1973  Fed. Rep. of Germany ...... 24/68 F

Primary Examiner—F. Barry Shay
Attorney, Agent, or Firm—Berman, Aisenberg & Platt

[57] ABSTRACT

A wild fowl call includes a silencer which is pivotally mounted to the sound box of the call. When the silencer is in a first position, an element lies between the arm and the sound box of the call to silence the call. The silencer may be rotated to a second position wherein the arm is free to move with respect to the sound box to operate the call.

The silencer may be made from a single piece of wire and is preferably coated with a non-abrasive, resilient material.

6 Claims, 3 Drawing Figures

FOWL CALL SILENCER

FIELD OF THE INVENTION

This invention relates to the art of devices which create a sound for calling wild fowl, and particularly to a silencer for such a call.

BACKGROUND ART

A wild fowl call which includes a body and an arm pivotally mounted to the body is known. As the arm moves over the body, the body is caused to vibrate to create a sound which attracts wild fowl. A turkey call is one such wild fowl call and is used for attracting wild turkeys by a hunter.

U.S. Pat. No. 4,343,108 (Lee) shows a turkey call wherein the body, or sound box, has three planar members. An arm pivotally mounted to the box may be used to cause the vertical walls to vibrate thus creating a sound which attracts wild turkeys. This call includes elastic elements which urge the arm against the body to maintain it in a preferred position.

U.S. Pat. No. 3,100,948 (Tax) shows a wild fowl call having a bar of slate attached to the arm for causing the walls of the sound box to vibrate.

SUMMARY OF THE INVENTION

Prior art calls have the disadvantage that they often produce sound when the hunter wishes to be silent. For example, a hunter may desire to move slowly and quietly to stalk fowl after they have been called. Prior art calls have no mechanism to silence them, and it is common for the movement of the hunter to jostle the call so that it produces undesired sounds.

When the hunter is not using the call, he typically places it in a bag which may be closed by a drawstring and hangs from his belt. The call is thus still capable of producing sound as it swings from the hunter's belt, and the sound may alert the fowl to the presence of the hunter.

Applicant's invention is a silencer which in one position prevents the arm from contacting the sound box or body of the call so as to prevent any sound from being made by the call. In a second position of the silencer, the arm is free to contact the body and to move with respect to it to create sound to attract wild fowl. Applicant's preferred embodiment is applied to a turkey call, but it may be applied to similar types of wild fowl calls.

Applicant's silencer is pivotally mounted to the body of the call and includes an elongated element for lying between the body and the arm of the call when the silencer is in a position to prevent sound. The elongated element is attached to a shank which is pivotally mounted on the body of the call so that when it is desired to operate the call, the elongated element is simply pivoted out of the way. The relationships between the pivot point, the shank, and the elongated element are such that when the elongated element is lying between the arm and the sound box, the natural stiffness of the arm maintains the silencer in place.

The preferred embodiment of the silencer is made of a single piece of wire bent to provide a pin, a shank, a first elongated element for lying between the arm and the sound box, a second elongated element for lying on the side of the arm opposite the first elongated element. In the preferred embodiment, the silencer is dipped in a liquid plastic after a wire is bent so that the parts of the silencer which contact the call are covered by a smooth, non-abrasive, resilient material.

It is an object of this invention to provide a wild fowl call having a silencer thereon.

It is another object of this invention to provide a turkey call having a silencer thereon.

It is a still further object of this invention to provide a silencer which may be attached to a prior art wild fowl call.

DETAILED DESCRIPTION OF THE INVENTION

Figure 1:
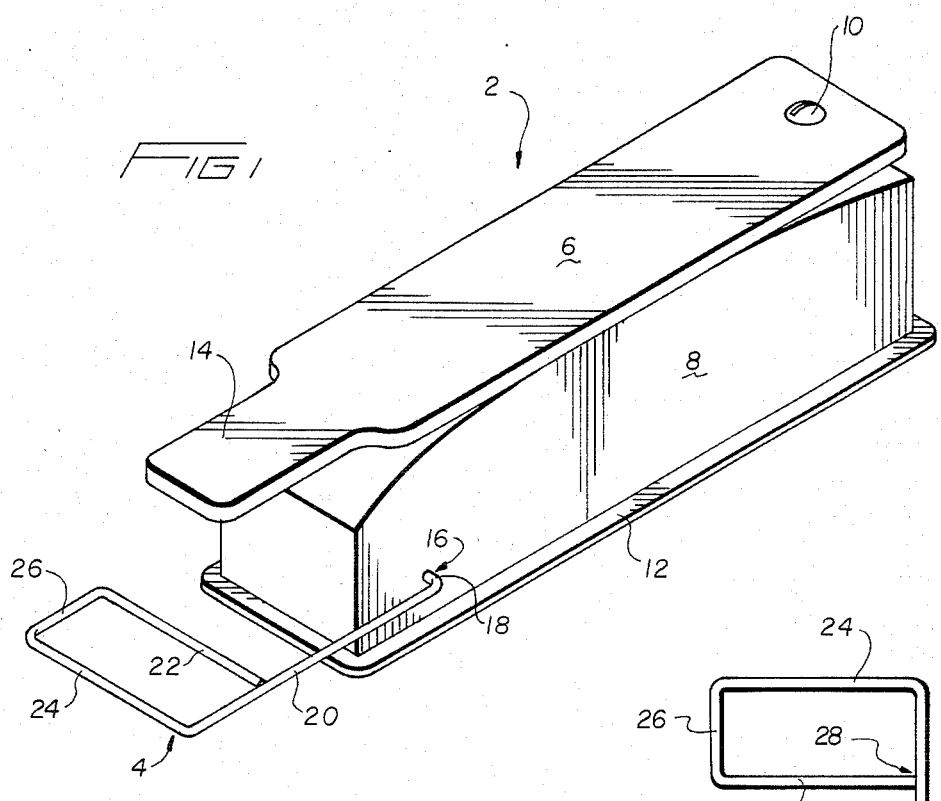
FIG. 1 is a perspective of a known turkey call having the inventive silencer thereon.

FIG. 1 shows a perspective view of a prior art turkey call 2 having applicant's inventive silencer 4 thereon. The call 2 includes an arm 6 and a sound box 8. The arm 6 is pivotally mounted to the sound box 8 by means of a screw 10 which extends through the arm 6 and into the sound box 8. The sound box 8 has a base 12. The call may be operated by holding base 12 in one hand and moving arm 6 across the top of sound box 8 to cause sound box 8 to vibrate. The arm 6 is provided with a handle portion 14 to facilitate grasping by the operator.

The silencer 4 is pivotally mounted to the sound box 8 at pivot 16. A pin 18 fits into a hole in the sound box 8 to provide the pivot. A shank 20 extends at right angles to the pin 18, and a first elongated element 22 extends at right angles to the shank 20 and parallel to pin 18. A second elongated element 24 extends parallel to the first elongated element 22, but is spaced therefrom. The ends of elements 22 and 24 remote from the shank 20 are connected by element 26.

Figure 2:
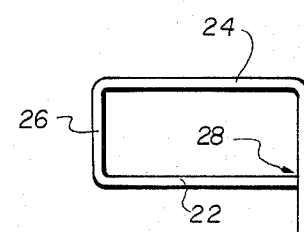
FIG. 2 is an elevation view of the inventive silencer.

FIG. 2 shows how the silencer 4 may be constructed of a single piece of wire. The wire is bent to form the pin 18, shank 20, first elongated element 22, second elongated element 24 and connecting element 26. After making the bends required to produce these elements, the end of the first elongated element 22 adjacent shank 20 may be joined at 28, for example by welding, soldering, or gluing.

After forming, the silencer 4 may be dipped into a liquid plastic, or similar material to coat all of the elements, except possibly pin 18, with a non-abrasive, resilient material. This will prevent the silencer from scratching the turkey call and will also aid in silencing the call.

Figure 3:
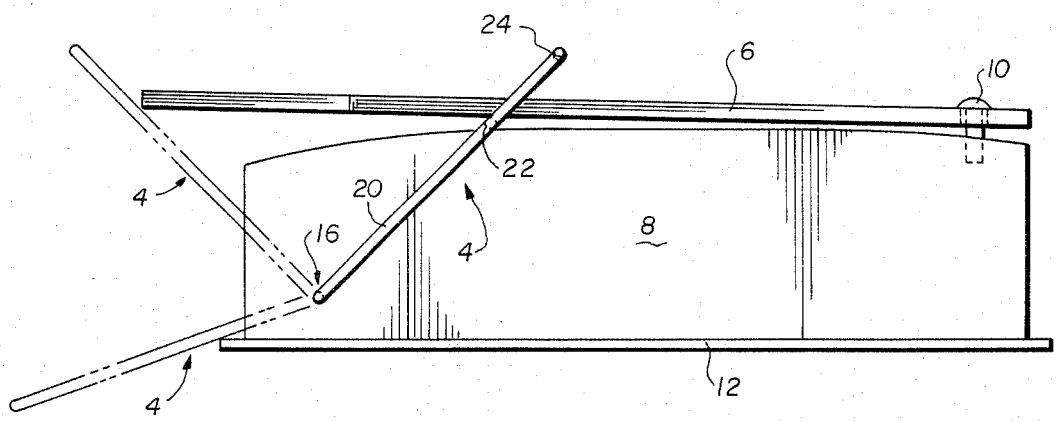
FIG. 3 is a side elevation of the turkey call of FIG. 1 showing the operation of the inventive silencer.

FIG. 3 shows how the silencer is pivoted from a first position wherein the first elongated element 22 lies between the arm 6 and the sound box 8 and a second position where the silencer permits free movement of the arm 6 with respect to the sound box 8. The silencer 4 is simply pivoted about pivot point 16 so that the arm 6 slides between the first and second elongated elements 22, and 24, and the silencer is then pivoted to the location shown in solid lines in FIG. 3. As may be seen in this figure, the elongated element 22 prevents the arm 6 from touching the sound box 8. The shank 20 and connecting element 26 prevent the arm from moving sideways, and the second elongated element 24 prevents the arm from moving upward. FIG. 3 shows the elongated element spaced from the top of arm 6, and this spacing may be reduced, or in some cases the element 24 may lie on top of arm 6 to provide a tighter fit of the silencer.

The silencer 4 is maintained in the position shown in solid lines in FIG. 3 by the natural stiffness of the arm 6 and some calls have a spring surrounding screw 10. The interaction of the arm 6 and the screw 10 result in the arm naturally resisting being raised too far. This natural resistance tends to apply a force to the first elongated element 22 which provides a clock-wise torque about point 16. This torque tends to maintain the silencer in the operative position shown in FIG. 3. When it is desired to rotate the silencer into a position to allow operation of the turkey call 2, the silencer is simply rotated in a counter clockwise direction by lifting up on the arm 6 to allow the silencer 4 to rotate.

It will be seen that a unique silencer for a wild fowl call, preferably a turkey call, has been shown and described. Many equivalent embodiments of this invention will be apparent to those of skill in the art.

It is claimed:

1. Apparatus comprising:
a sound box means having a portion adapted to vibrate and create sound,
arm means for causing said portion to vibrate when said arm means moves in contact with said portion, means mounting said arm means on said sound box means, and silencer means pivotally mounted thereto for preventing said arm means from causing vibrations of said sound box means in a first position and for allowing said arm means to cause said vibrations in a second position, wherein said silencer means comprises an elongated element and a shank extending transversely to said elongated element, said shank being pivotally mounted to said sound box means at a location so that said arm means maintains said elongated element between said arm means and said box means and in a position such that said arm means does not engage said portion of said sound box means in said first position thereof, the length of said shank being such that said shank extends at an oblique angle with respect to said arm means when said elongate element is in said first position.

2. The apparatus of claim 1 wherein said silencer means further includes an upper elongated element which extends parallel to said elongated element, said elongated element and said upper elongated element being spaced by a distance greater than the thickness of said arm means, and wherein said arm means is received between said elongated element and said upper elongated element when said silencer means is in said first position.

3. The apparatus of claim 2 wherein said elongated element and said upper elongated element are connected at respective first ends by said shank and at respective second ends to form a closed loop for receiving said arm means.

4. The apparatus of claim 3 wherein said shank is integral with a pivot pin, said pivot pin extending from said shank parallel to said elongated element and being received in a hole in said sound box means at said location.

5. The apparatus of claim 4 wherein said silencer means comprises a single piece of wire at least partially coated with a smooth, resilient material.

6. The apparatus of claim 5 wherein said arm means and sound box means are adapted to produce a sound to attract a wild turkey.

* * * * *